(12) United States Patent
Tapalian et al.

(10) Patent No.: US 6,668,111 B2
(45) Date of Patent: Dec. 23, 2003

(54) OPTICAL MICROCAVITY RESONATOR SENSOR

(75) Inventors: Haig Charles Tapalian, Canton, MA (US); Juha-Pekka Laine, Boston, MA (US)

(73) Assignee: The Charles Stark Draper Laboratory, Cambridge, MA (US)

( * ) Notice: Subject to any disclaimer, the term of this patent is extended or adjusted under 35 U.S.C. 154(b) by 25 days.

(21) Appl. No.: 09/894,418

(22) Filed: Jun. 28, 2001

(65) Prior Publication Data

US 2003/0206693 A1 Nov. 6, 2003

(51) Int. Cl.$^7$ .............................. G02B 6/26; G02B 6/42
(52) U.S. Cl. .............................. 385/28; 385/27; 385/30
(58) Field of Search ............................. 385/28, 14, 27, 385/30, 49, 129, 130, 131, 132, 140; 372/92

(56) References Cited

U.S. PATENT DOCUMENTS

| | | | |
|---|---|---|---|
| 4,695,121 A | 9/1987 | Mahapatra et al. | 350/96.12 |
| 4,807,232 A | 2/1989 | Hart et al. | 372/18 |
| 5,130,843 A | 7/1992 | He et al. | 359/285 |
| 5,268,693 A | 12/1993 | Walsh | 372/74 |
| 5,420,688 A | 5/1995 | Farah | 356/358 |
| 5,742,633 A | 4/1998 | Stone et al. | 372/92 |
| 6,009,115 A | 12/1999 | Ho | 372/92 |
| 6,023,540 A | 2/2000 | Walt et al. | 385/12 |
| 6,040,191 A | 3/2000 | Grow | 436/172 |
| 6,058,127 A | 5/2000 | Joannopoulos et al. | 372/92 |
| 6,266,459 B1 | 7/2001 | Walt et al. | 385/12 |
| 6,301,426 B1 * | 10/2001 | Jameson et al. | 385/140 |
| 6,389,197 B1 * | 5/2002 | Iltchenko et al. | 385/28 |
| 6,594,425 B2 * | 7/2003 | Tapalian et al. | 385/50 |

OTHER PUBLICATIONS

Little, B. et al., Pedestal antiresonant reflecting waveguides for robust coupling to microsphere resonators and for micro photonic circuits, Optics Letters, vol. 25, No. 1, pp. 73–75, 2000.

Laine, J.P. et al., Novel techniques for whispering–gallery––mode excitation in silica microspheres, Integrated Photonics Research 1999, OSA Technical Digest, Santa Barbara, California, Jul. 1999.

Laine, J.P. et al., Acceleration sensor based on high–Q optical microsphere resonator and pedestal antiresonant reflecting waveguide coupler, Sensors and Actuators A93, 1–7 (2001).

Laine, J.P. et al., Silica microsphere resonator and SPAR-ROW waveguide coupler structures, Integrated Photonics Research 2000, OSA Technical Digest, Quebec City, Canada, Jul. 2000.

Laine, J.P. et al., Microsphere resonator mode charaterization by pedestal anti–resonant reflecting waveguide coupler, IEEE Photonics Technology Letters, vol. 12, 1004–1006, 2000.

* cited by examiner

*Primary Examiner*—Euncha Cherry
*Assistant Examiner*—Joshua L Pritchett
(74) *Attorney, Agent, or Firm*—McDermott, Will & Emery

(57) ABSTRACT

An optical resonator accelerometer includes an optical microcavity and an optical waveguide that evanescently couples light incident on an input end of the waveguide core into the high-Q WGMs of the microcavity at a coupling efficiency of over 99%. The waveguide includes a waveguide core, and a multi-layer dielectric stack that has alternating high and low refractive index dielectric layers. The reflectivity of the dielectric stack is sufficient to isolate the waveguide core and the microcavity from the substrate. A flexure has a first end mounted to the substrate, and a second end arranged to interact with said optical microcavity. The flexure is responsive to an inertial input to cause a change in the coupling geometry between the microcavity and the optical waveguide.

38 Claims, 15 Drawing Sheets

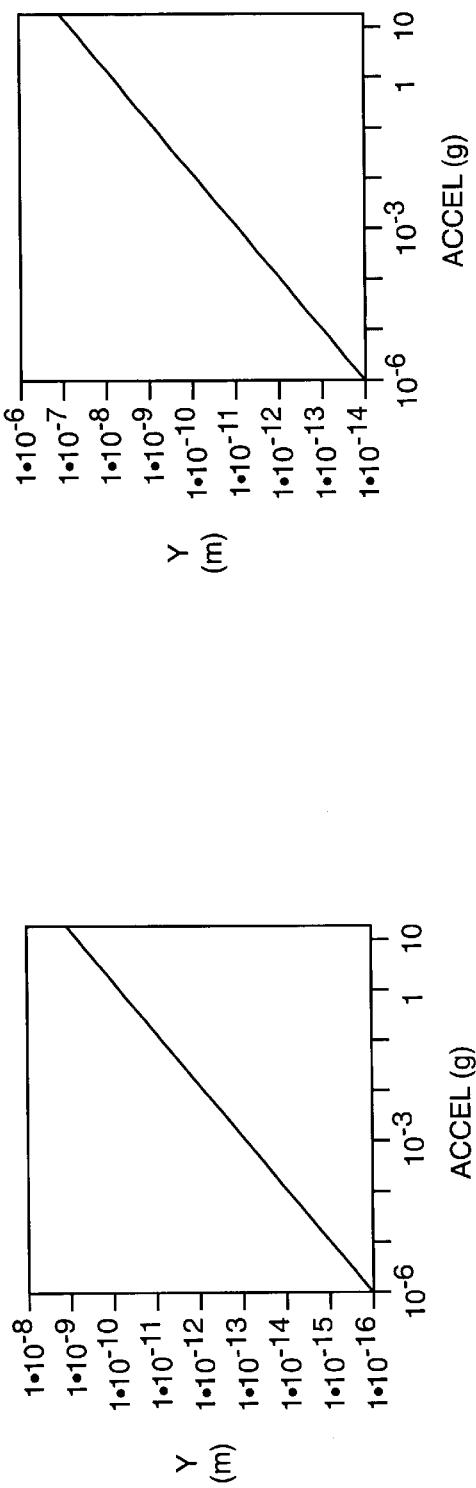
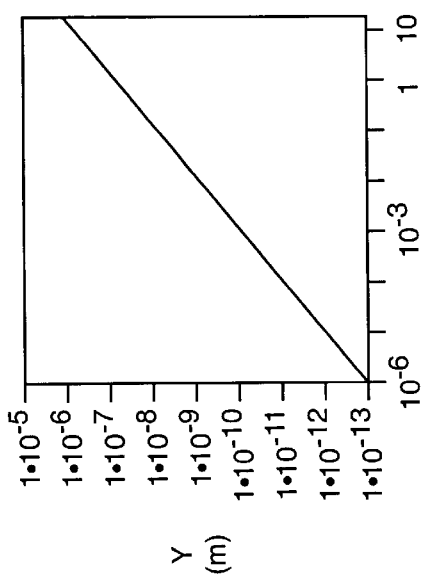
FIG. 3A
FIG. 3B
FIG. 3C

| MEASUREMENT TECHNIQUE | READOUT DISPLACEMENT RESOLUTION (μm) | DYNAMIC RANGE (DR FOR LINEARITY) |
|---|---|---|
| LINEWIDTH | $4 \times 10^{-4}$ | 2000(100) |
| COUPLING STRENGTH | $5 \times 10^{-7}$ | $10^6 (10^5)$ |
| PHASE | $10^{-11}$ | $10^{11} (10^{10})$ |

FIG. 5

| APPLICATION | EXISTING TECHNIQUES | MiRRA/ OPTICAL MEMS |
|---|---|---|
| COMMON GUIDANCE | 1 µg - 20 g (BOOST) 1 µg - 100 g (RE-ENTRY) | 100 ng - 1000 g |
| TACTICAL MISSILES | 100 µg - 10 g | 100 ng - 1000 g |
| GUN LAUNCHED MISSILES | 30,000 g (LAUNCH) 1 mg - 5 g (FLIGHT) | 1 mg - 100,000 g |
| GRAVIMETER | 2 µGAL (2 ng) | 100 µGAL (100 ng) |

FIG. 12

OPTICAL MICROCAVITY RESONATOR SENSOR

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to optical sensors, and in particular to highly sensitive, integrated microcavity-waveguide sensor.

BACKGROUND OF THE INVENTION

During the past few years, a substantial amount of research has been performed in the field of optical microcavity physics, in order to develop high cavity-Q optical microcavity resonators. In general, resonant cavities that can store and recirculate electromagnetic energy at optical frequencies have many useful applications, including high-precision spectroscopy, signal processing, sensing, and filtering. Many difficulties present themselves when conventional planar technology, i.e. etching, is used in order to fabricate high quality optical resonators, because the surfaces must show deviations of less than about a few nanometers. Optical microcavity resonators, on the other hand, can have quality factors that are several orders of magnitude better than typical surface etched optical resonators, because these microcavities can be shaped by natural surface tension forces during a liquid state fabrication. The result is a clean, smooth silica surface with low optical loss and negligible scattering. These microcavities are inexpensive, simple to fabricate, and are compatible with integrated optics.

Optical microcavity resonators have quality factors (Qs) that are higher by several orders of magnitude, as compared to other electromagnetic devices. Measured Qs as large at $10^{10}$ have been reported, whereas commercially available devices typically have Qs ranging from about $10^5$ to about $10^7$. The high-Q resonances encountered in these microcavities are due to optical whispering-gallery-modes (WGM) that are supported within the microcavities.

As a result of their small size and high cavity Q, interest has recently grown in potential applications of microcavities to fields such as electro-optics, microlaser development, measurement science, and spectroscopy. By making use of these high Q values, microspheric cavities have the potential to provide unprecedented performance in numerous applications. For example, these microspheric cavities may be useful in applications that call for ultra-narrow linewidths, long energy decay times, large energy densities, and fine sensing of environmental changes, to cite just a few examples.

In order for the potential of microcavity-based devices to be realized, it is necessary to couple light selectively and efficiently into the microspheres. Since the ultra-high Q values of microcavities are the result of energy that is tightly bound inside the cavity, optical energy must be coupled in and out of the high Q cavities, without negatively affecting the Q. Further, the stable integration of the microcavities with the input and output light coupling media should be achieved. Also, controlling the excitation of resonant modes within these microcavities is necessary for proper device performance, but presents a challenge for conventional waveguides.

Typically, good overall performance is gained by accessing the evanescent field in a waveguide. Also, only waveguide structures provide easy alignment and discrete, clearly defined ports. Because of cavity and waveguide mode leakage into the substrate and into the modes within the fiber cladding, power extraction from the input optical radiation has proved to be inefficient for conventional planar waveguides, however.

U.S. patent application Ser. No. 09/893,954 discloses a highly efficient and robust mechanism for coupling optical microcavity whispering-gallery modes into integrated optical waveguide chips. SPARROW (Stripline Pedestal Antiresonant Reflecting Waveguides) are used to achieve vertical confinement and substrate isolation through a highly reflective stack of alternating high and low refractive index dielectric layers. Q-values of over $10^9$, and coupling efficiencies of over 99% have been observed.

Because of the ability of SPARROW waveguide chips to excite resonant modes having unprecedentedly high Q-values in optical microcavities, it is desirable to implement SPARROW waveguide chips in sensing applications, so as to increase the resolution and dynamic range in these applications.

SUMMARY OF THE INVENTION

The present invention is directed to the implementation of a waveguide-coupled optical microcavity resonator for sensing applications. In particular, a SPARROW (Stripline Pedestal Antiresonant Reflective Optical Waveguide) optical chip structure is used to evanescently couple light into an optical microcavity at very high efficiencies, approaching 100%. An input, for example an external force or a change in an environmental condition such as temperature, causes the microcavity to move, and causes a change in the coupling geometry between the microcavity and the optical waveguide. In one embodiment, the change in coupling geometry is caused by a displacement of the microcavity in response to the inertial input, the displacement resulting in a change in the coupling gap between the microcavity and the waveguide. Using a sensor constructed in accordance with the present invention, a resolution limit of about $10^{17}$m and a dynamic range of about $10^{10}$ can be reached for the sensing of acceleration, representing an improvement over prior art accelerators of several orders of magnitude.

An optical resonator sensor, constructed in accordance with the present invention, includes a substrate, a SPARROW optical waveguide disposed on the substrate, an optical microcavity, and a flexure. The optical microcavity is a fused silica microcavity, capable of supporting high Q-factor whispering-gallery-modes (WGM). Photons within these modes are strongly confined slightly below the surface of the microsphere, due to repeated total internal reflection, thus resulting in very long cavity lifetimes and photon path lengths. Cavity Qs as high as $10^{10}$ have been reported.

The SPARROW optical waveguide includes a multi-layer dielectric stack disposed on the substrate, and a waveguide core. The dielectric stack includes alternating high and low refractive index dielectric layers, and is highly reflective.

The reflectivity of the dielectric is sufficient to isolate the optical modes in the waveguide. The waveguide core is substantially planar, and is disposed on the dielectric stack. The waveguide core extends along an axis, parallel to the waveguide plane, from an input end to an output end. The waveguide core is adapted for transmitting light incident on the input end to the output end.

An optical microcavity is constructed and arranged so as to optically interact with light incident on the input end of the optical waveguide core. In one embodiment, the microcavity may be disposed along a sensing axis, perpendicular to the waveguide plane. A flexure has a first end coupled to the substrate, and a second end coupled to the optical microcavity. The flexure is responsive to an input, such as an external force or acceleration, to cause a change in the coupling geometry of the optical microcavity along the sensing axis.

The readout response of the sensor to an input can be determined by measuring a variety of parameters, including but not limited to the coupling gap, the resonance linewidth of the microcavity, the coupling strength of the microcavity, and the resonant frequency of the microcavity. Because of the high Qs of the microcavities, the resolution and dynamic range of the sensor can be increased significantly. Sensor resolution of about $10^{-17}$ m and a dynamic range of about $10^{10}$ have been attained for acceleration measurements.

BRIEF DESCRIPTION OF THE DRAWINGS

FIGS. 3A, 3B, and 3C provide graphs of the displacement of the microcavity as a function of acceleration, for various lengths of the fiber stem.

FIG. 5 is a table providing a summary of the microsphere resonator readout response analysis, in terms of readout resolution and dynamic range, for different measurement techniques involving linewidth, coupling strength, and phase, respectively.

FIG. 12 is a table comparing the g-sensitivity of a microcavity resonator sensor, constructed in accordance with the present invention, with the g-sensitivity of other devices known in the art.

DETAILED DESCRIPTION

The present invention is directed to a high-resolution, miniaturized optical microcavity resonator sensor. The sensor is an integrated optical system that includes a waveguide-coupled microcavity resonator. In particular, a SPARROW waveguide structure is used for evanescently coupling light into a high-Q optical microcavity, at extremely high efficiencies. The sensor is responsive to an input, such as an external force, or to an environmental condition, such as temperature, to provide a very high-resolution readout.

Figure 1A:
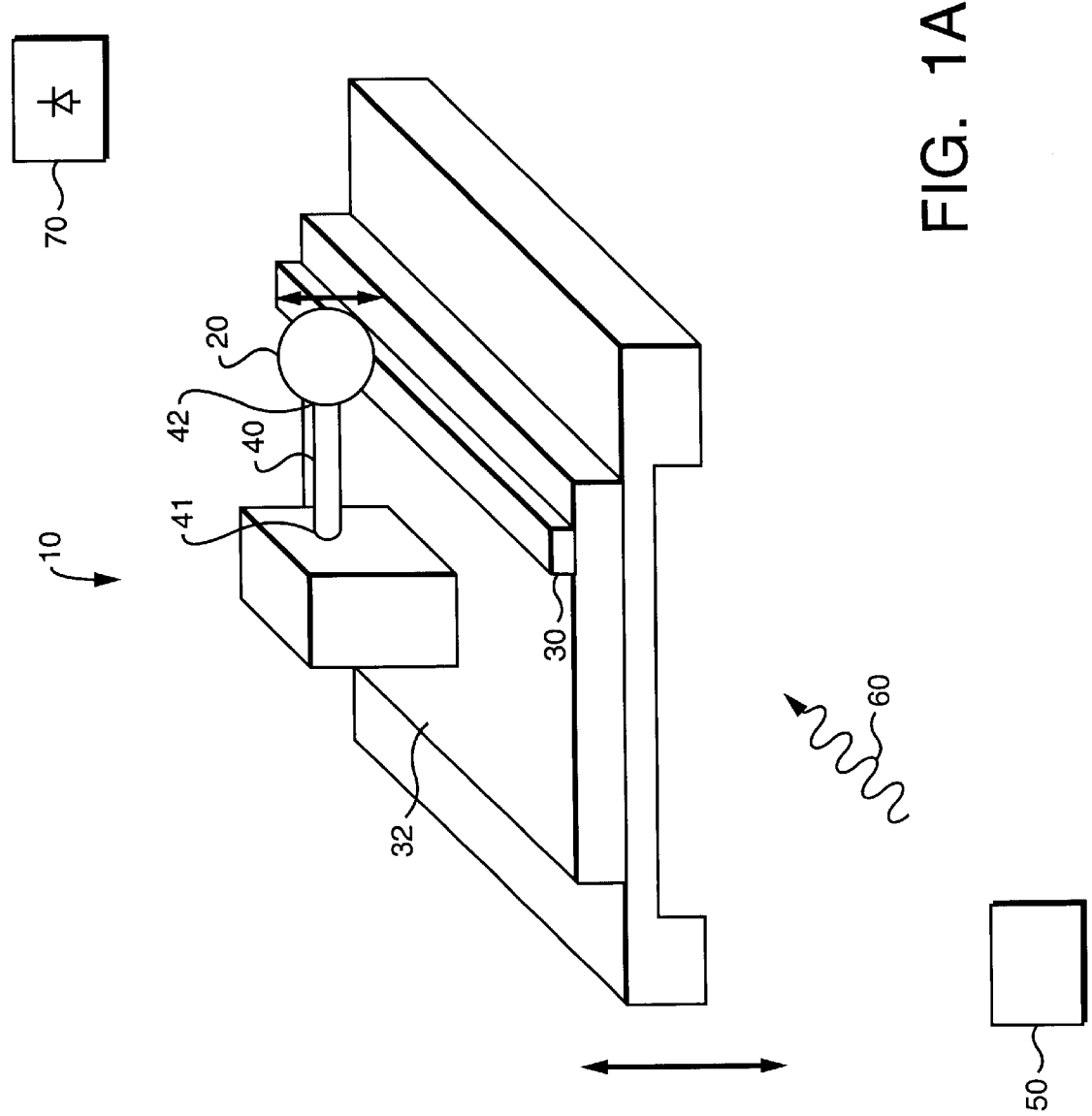
FIG. 1A illustrates a microcavity resonator accelerometer, constructed in accordance with the present invention.

A microcavity resonator sensor, constructed in accordance with the present invention, may be used in a variety of inertial sensing applications, including but not limited to ultra-high resolution displacement readout, accelerometer, gyroscope, gravimeter, and seismic sensor. FIG. 1A illustrates one embodiment of an integrated microcavity-waveguide sensor 10, in accordance with the present invention. Optical microcavity resonators can be utilized as sensing devices by monitoring perturbations of the evanescent field light coupling properties. In the illustrated embodiment, the sensor 10 is a flexure-based device. The potential displacement readout range of the accelerometer 10 is from about $10^{-17}$ m to about 120 nm. The corresponding range of measurable acceleration is from about $3 \times 10^{-10}$ g to about 3 g, although this range may be adjusted by varying the system design parameters.

In overview, the system 10 includes a substrate, an optical microcavity 20, and a waveguide chip 30 that is used to couple light into and out of the optical microcavity 20, all integrated into a single structure. The substrate is preferably substantially planar, and may be made of silicon, by way of example. An optical source 50, preferably a laser, provides a beam 60 of input radiation directed to the waveguide. A photodetector 70 detects output optical radiation from the waveguide 30.

In a preferred embodiment, the optical microcavity 20 is a fused silica microsphere or microring, fabricated from singlemode optical fiber. The optical microcavity 20 may be fabricated by surface tension shaping of the tip of freshly melted optical fiber. Melting of the tip of a silica wire or fiber may be accomplished through arcing in a fusion splicer, or by means of a gas flame. In a preferred embodiment, the waveguide chip 30 is a SPARROW waveguide deposited on a substrate 32, discussed in further detail below in conjunction with FIG. 1B. In the illustrated embodiment, integration of the microcavity 20 and the waveguide chip 30 is accomplished using a fiber stem 40, which remains attached to the optical microcavity 20, following the fabrication of the microsphere. The fused silica fiber stem 40 functions as a small, stiff flexure. The fused silica microsphere functions as a proof mass.

Figure 1B:
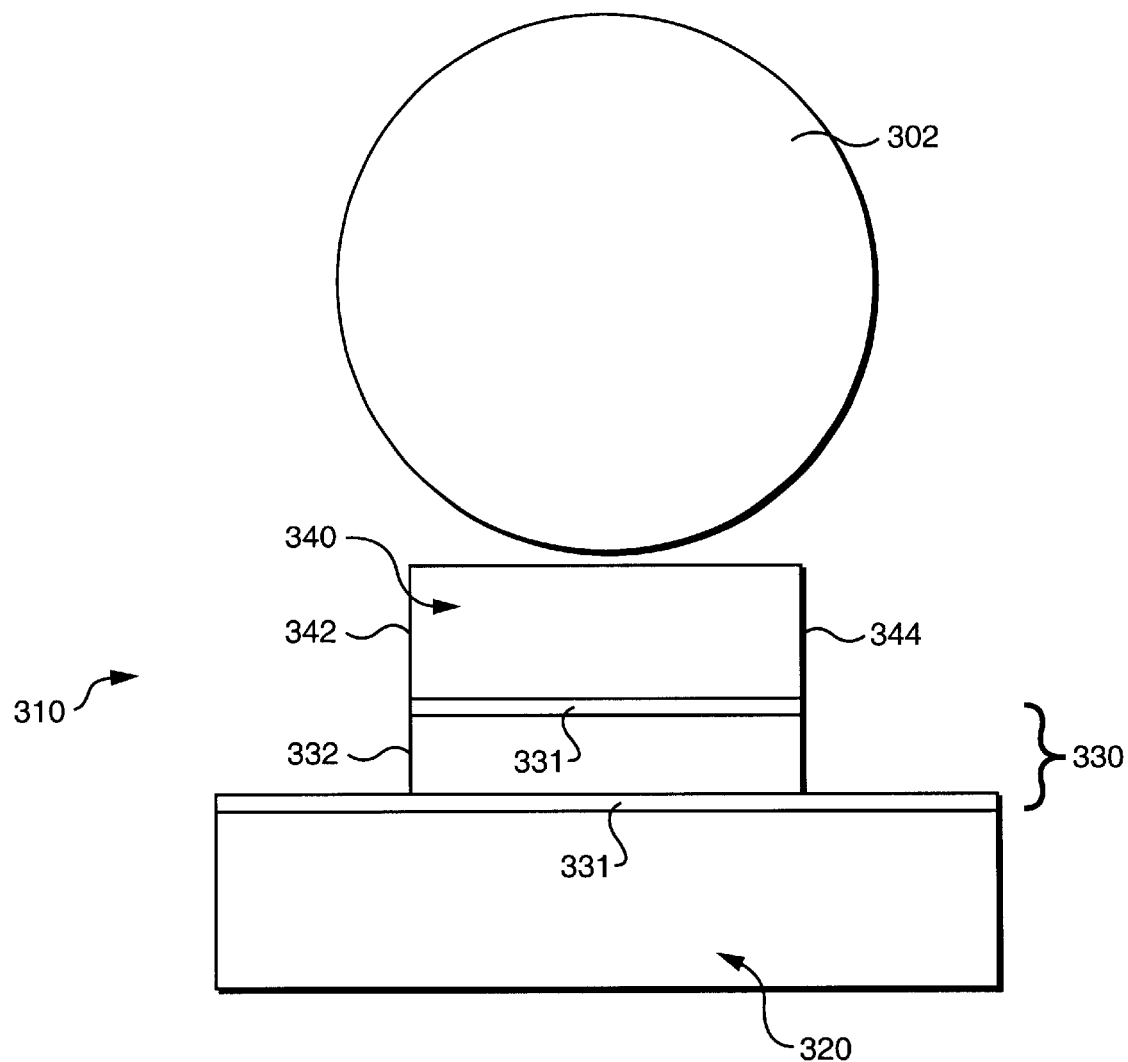
FIG. 1B illustrates the microcavity displacement readout of the integrated microcavity-waveguide accelerator shown in FIG. 1A.

In a preferred embodiment, the waveguide chip 30 is a SPARROW waveguide, which provides an efficient and robust coupling mechanism for exciting whispering-gallery-modes in the optical microcavity 20, as described in the CSLL-625 application. FIG. 1B illustrates a SPARROW waveguide 310, constructed in accordance with the present invention. The SPARROW waveguide 310 includes a multi-layer, high-reflectivity dielectric stack 330 disposed on the substrate 320, and a waveguide core 340. The substrate 320 is substantially planar, and in one embodiment is made of silicon.

The dielectric stack 330 is composed of alternating high ($n_H$) and low ($n_L$) refractive index layers 331 and 332, made of a dielectric material. As a result, the dielectric stack 330 functions as a high reflectivity dielectric mirror. The larger the number of layers 331 and 332, the higher the reflectivity of the stack 130 becomes. While the illustrated embodiment includes only one low index layer 332 disposed between two high index layers 331, the number of the layers 331 and 332 can be increased in order to increase the reflectivity of the stack 330. The alternating layers 331 and 332 forming the dielectric stack 330 provide a cladding for the SPARROW waveguide core 340, i.e. the layers forming the stack 330 may be regarded as cladding layers.

The high reflectivity of the dielectric stack 330 permits isolation of the optical modes of the microcavity and the waveguide core 340 from the waveguide cladding and the substrate. By isolating the waveguide core 340 using the high-reflectivity dielectric stack 330, the SPARROW 310 circumvents the need for obtaining low refractive index cladding materials. One of the high refractive index layers 331 is in contact with the substrate 320.

In one embodiment, the high refractive index layer 331 is made of Si (silicon), while the low refractive index layer 332 is made of $SiO_2$ (silica). In one embodiment, the high refractive index $n_H$ is about 3.5, and the low refractive index nL is about 1.45, although other refractive indices are also within the scope of the present invention. The refractive indices required for efficiently guiding light within the waveguide depend on the wavelength of optical radiation.

The waveguide core 340 is disposed on top of the dielectric stack 330, and is in contact with another one of the high refractive index layers 331. The waveguide core 340 includes an input end 342 and an output end 344, and is adapted for transmitting optical radiation incident on the input end 342 to the output end 344. In one embodiment, the waveguide core is made of silica, and is characterized by the low refractive index nL.

As described earlier, the fused silica fiber stem 40 (shown in FIG. 1A) functions as a small, stiff flexure. Referring back to FIG. 1A, the flexure 40 has a first end 41 coupled to the substrate 32, and a second end 42 arranged to interact with the optical microcavity 20. The flexure 40 is responsive to an input, such as acceleration by way of example, to cause a change in the coupling geometry between the microcavity 20 and the optical waveguide 30.

Figure 1C:
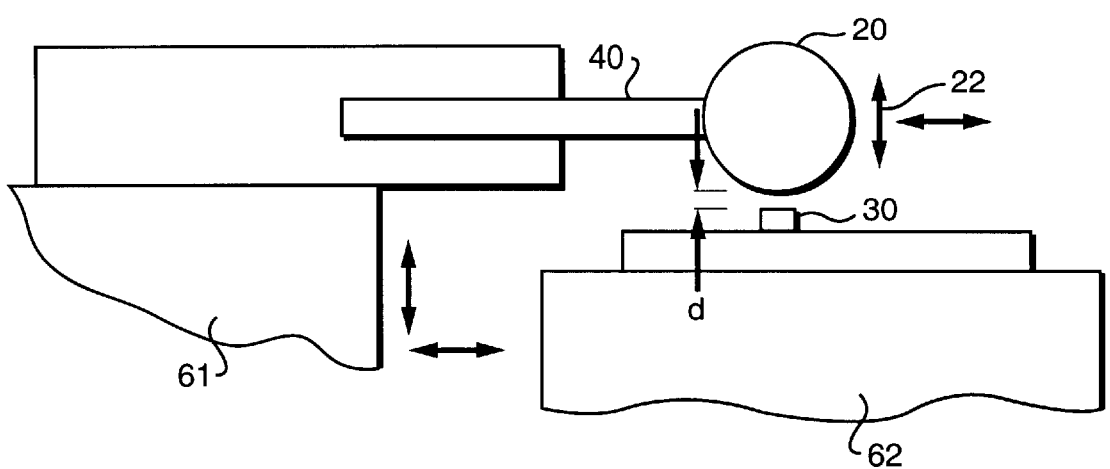

FIG. 1C illustrates the microcavity displacement readout of the integrated microcavity-waveguide sensor 10 shown in FIG. 1. The stem 20 is bonded to the chip surface in a way such that the coupling gap d between the microcavity 20 and the waveguide 30 is less than 1 $\mu$m, i.e. within the range for evanescent light coupling between the waveguide 30 and the microcavity 20. When bonded to the chip surface, the fiber stem 20 functions as a flexure for the microcavity readout. A force applied along the microsphere-waveguide coupling axis, shown in FIG. 1B as 22, therefore results in a displacement of the microcavity 20 relative to the waveguide 30, and a corresponding change in the coupling gap. A microcavity positioner 61 and a waveguide positioner 63 may be used to position the microcavity and the waveguide.

In an exemplary embodiment, a fiber stem approximately 50 $\mu$m in diameter and a microsphere approximately 200 $\mu$m in diameter may be integrated with the waveguide 30. The fiber stem 20 may be anchored to the waveguide surface, using epoxy, by way of example. In one embodiment, the microsphere may be attracted to the surface by electrostatic forces, and may be positioned above the waveguide channel using rails fabricated into the waveguide chip.

Figure 2:
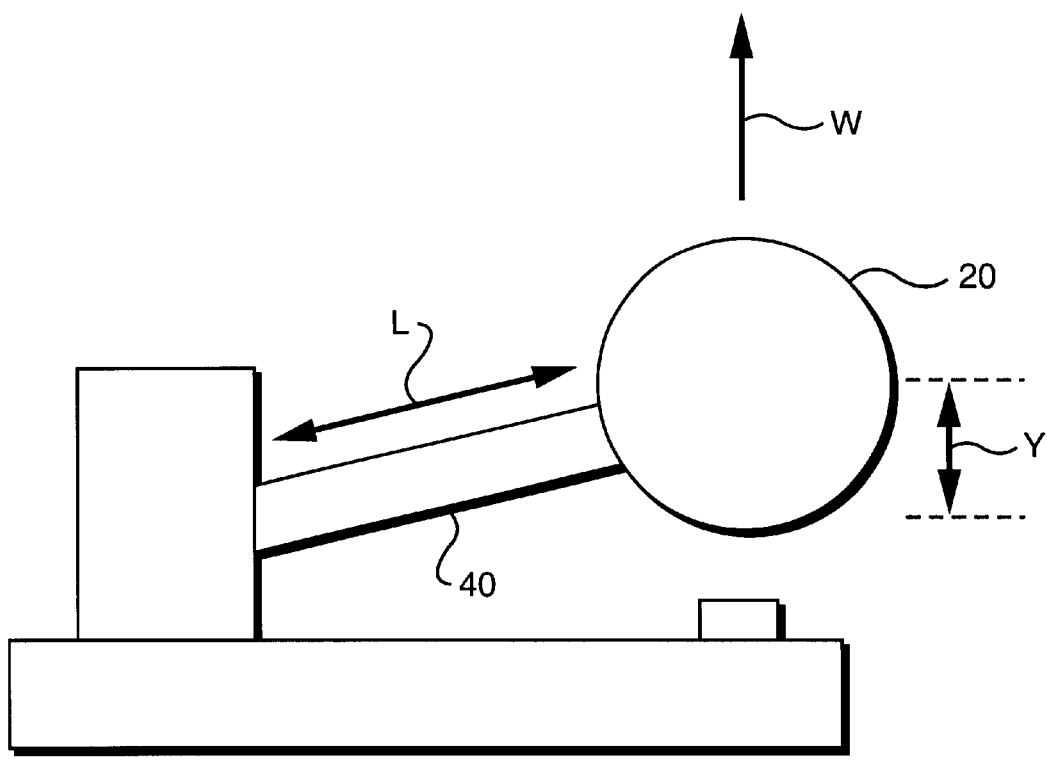
FIG. 2 provides a cross-sectional view of an integrated microcavity-waveguide accelerometer, illustrating the microcavity displacementy in response to an applied load W.

FIG. 2 provides a cross-sectional view of the integrated microcavity-waveguide accelerometer, illustrating the microcavity displacement y in response to an applied load W. If the microcavity/fiber-stem system is approximated as a point load at the end of a beam, treating the microcavity as a proof mass, the microcavity displacement y resulting from applied force $$W = \rho \frac{\pi}{6} d^3 a$$

is given by $$y = \frac{Wl^3}{3EI}$$

where I is the area moment of inertia of the fiber stem $$\left(I = \frac{\pi D^4}{64}\right),$$

d is the microsphere diameter,
l is the fiber stem length,
D is the fiber stem diameter,
$\rho$ is the density of fused silica ($2.2\times10^3$ kg/m$^3$),
and E is the bulk modulus of fused silica ($7\times10^{10}$ N/m$^2$).

FIGS. 3A, 3B, and 3C provide plots of the displacement of the microcavity as a function of acceleration for various lengths of the fiber stem. The displacement y is plotted in these figures as a function of proof mass acceleration for nominal values of the microsphere and fiber stem parameters, namely a 300 $\mu$m diameter microsphere, and a 125 $\mu$m diameter fiber stem. Several fiber stem lengths are used in order to illustrate the device response for a range of flexure lengths, namely 1 mm for FIG. 3A, 5 mm for FIG. 3B, and 1 cm for FIG. 3C.

Figure 4:
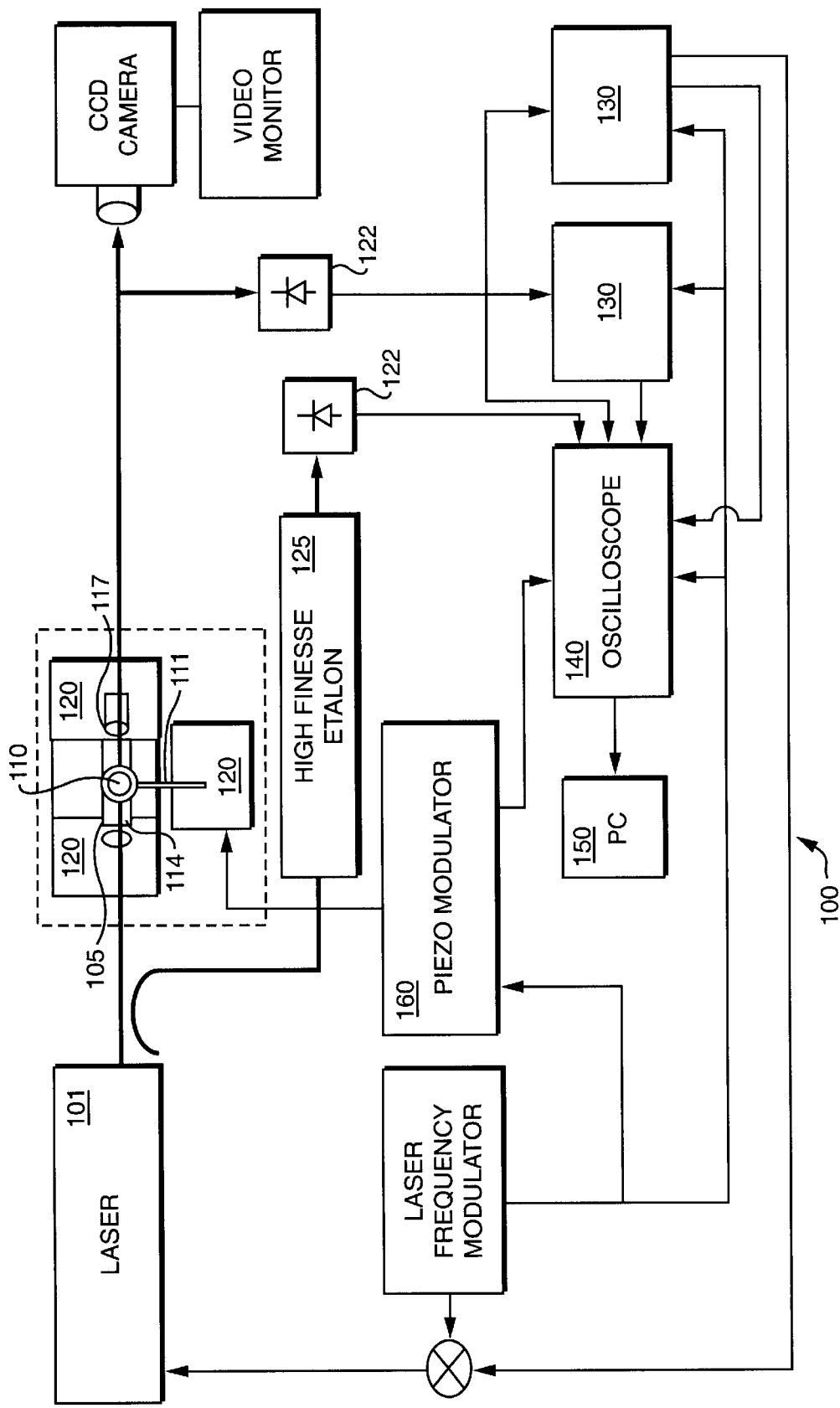
FIG. 4 provides an overview of an experimental layout of a microcavity resonator accelerometer, constructed in accordance with the present invention.

FIG. 4 provides an overview of an experimental layout of a microcavity resonator accelerometer 100, constructed in accordance with the present invention. An optical source 101, preferably a laser, generates incident light directed at an input end 105 of a SPARROW waveguide 114. The laser 101 is preferably a narrowband tunable external-cavity diode laser emitting light at a wavelength 1.55 $\mu$m, with a fiber-coupled output of greater than 10 mW. Both fine and coarse tuning modes may be available for the laser 101. Typically, a maximum fine-tuning range of 30 GHz is sufficient to observe several microsphere resonances. A microcavity 110, formed at an end of a fiber stem 111, is positioned within an evanescent coupling distance of a SPARROW coupling waveguide 114. A collimating lens 117 is provided for collimating output optical radiation transmitted through the waveguide 109. Output optical radiation is detected by photodetectors 122. Ultra-high resolution nano-positioners 120 are provided for relative positioning of the fiber stem 111, coupling waveguide 114, microcavity 110, and the output coupling lens 117. With active feedback control, these piezo-driven positioners 120 can achieve 5 nm positioning resolution.

In one embodiment, the microcavity 110 and the waveguide 114 may be mounted on separate positioners, prior to the microcavity/waveguide integration step. The position of the microcavity 110 can be manipulated through the fiber stem 111, which preferably remains attached to the microcavity 110, following microsphere fabrication. In one form of the invention, a high-finesse etalon 125 can be utilized for frequency calibration of system parameters such as resonance linewidths. The etalon 125 may have a 150 MHz free spectral range, and less that 2 MHz resolution, by way of example. For wavelength calibration over large wavelength/frequency ranges, a Burleigh wavelength meter may be used. The Burleigh wavelength meter uses a frequency-stabilized HeNe laser to provide frequency accuracy to 30 MHz. In the illustrated embodiment of the invention, lock-in amplifiers 130 are used to lock the laser frequency to a microsphere resonance, and to measure resonant frequency shifts.

In a preferred embodiment of the present invention, the sensor is responsive to an inertial input, such as an external force or acceleration, to determine variables such as acceleration, distance, and velocity, by measuring the change in the coupling gap between the microcavity and the waveguide. The inertial input, preferably applied along the microsphere-waveguide coupling axis, results in a displacement of the microcavity 20 relative to the waveguide 30, and a corresponding change in the coupling gap.

There are several parameters which can be used to measure the microcavity readout response indicating the change in coupling gap: resonant frequency of the microsphere, resonance linewidth of the microsphere, coupling strength, also referred to as fractional depth, and phase. These parameters can all be used to monitor changes in the microsphere cavity Q induced by some form of coupled-mode perturbation. FIG. 5 is a table providing a summary of the microsphere resonator readout response analysis, in terms of readout resolution and dynamic range, for different measurement techniques involving linewidth, coupling strength, and phase, respectively. A description of these techniques is given below.

Figure 6A:
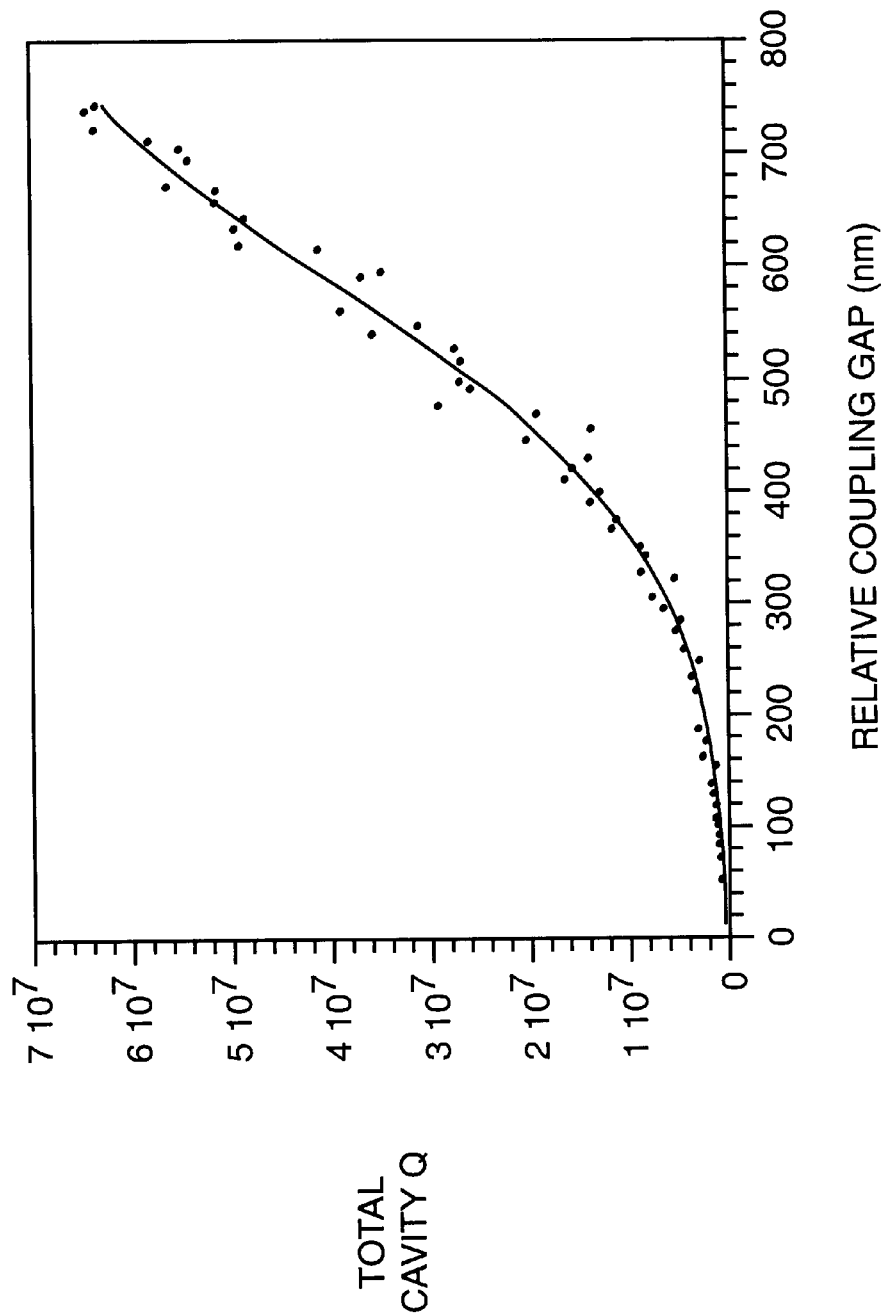
FIG. 6A illustrates the total cavity Q of the microcavity as a function of the relative coupling gap between the waveguide and the microcavity, in one exemplary embodiment of the present invention.

FIG. 6A illustrates the total cavity Q of the microcavity, in one exemplary embodiment of the present invention. In FIG. 6A, the total cavity Q(d) is plotted as a function of the relative coupling gap $Q_c(d)$ between the waveguide 30 and the microcavity 20. The Q is defined as $v/\Delta v$, where $v$ is the resonant frequency and $\Delta v$ is the linewidth. The cavity Q(d) of the microcavity resonator is therefore typically determined by measuring the cavity resonance linewidth $\Delta v$.

Figure 6B:
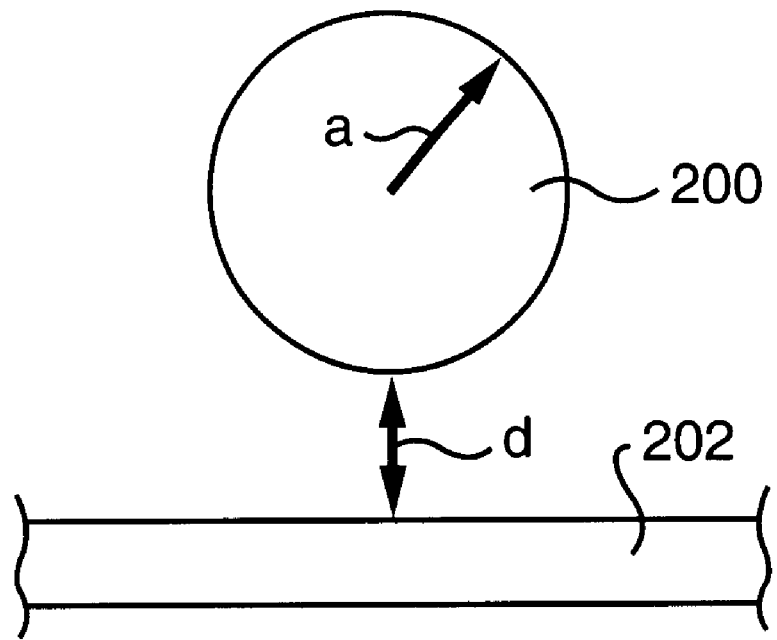
FIG. 6B illustrates the empirical parameters in an exemplary microcavity-waveguide cotipler configuration.

The linewidth $\Delta v$ may be expressed as a function of the displacement d between the microcavity and the waveguide, the intrinsic cavity $Q_0$, and empirical parameters including the microcavity radius a, the laser wavelength $\lambda$, and the index of refraction n of the fused silica microcavity. These empirical parameters are illustrated in FIG. 6B, which depicts the basic coupling configuration between a microsphere 200 and a waveguide 202, separated by a coupling gap d.

The coupling parameter $Q_c$, also called the loading parameter, can be approximated analytically as a function of the coupling gap, $$Q_c(d) = 102 \left(\frac{a}{\lambda}\right)^{5/2} \frac{n^3(n^2-1)}{4q-1} e^{2\gamma d} \qquad \text{Eq. 1}$$

where a is the microsphere radius (taken to be 100 $\mu$m),
$\lambda$ is the laser wavelength (1.55 $\mu$m),
n is the index of refraction of fused silica (1.46), q is the radial mode number,
and $\gamma$ is related to the wave number:

$$\gamma = \frac{2\pi}{\lambda}\sqrt{n^2-1}.$$

It is convenient to introduce a coefficient N(q) for $Q_c(d)$. N(q) is a function of the radial mode number, and is given by:

$$N(q) = 102 \left(\frac{a}{\lambda}\right)^{5/2} \frac{n^3(n^2-1)}{4q-1}. \qquad \text{Eq. 2}$$

The total cavity Q of the microsphere can now be expressed as a function of the coupling parameter $Q_c(d)$, and the intrinsic Q, which may be denoted as $Q_0$:

$$Q(d) = \frac{Q_0 Q_c(d)}{Q_0 + Q_c(d)} = \frac{Q_0}{1 + \frac{Q_0}{N(q)}e^{-2\gamma d}}. \qquad \text{Eq. 3}$$

Using equation 3, the WGM resonance linewidth may be expressed in terms of the total cavity Q and the coupling gap d:

$$\Delta v(d) = \frac{v}{Q(d)} = \frac{v}{Q_0}\left(1 + \frac{Q_0}{N(q)}e^{-2\gamma d}\right). \qquad \text{Eq. 4}$$

Since the microspheres are fabricated by surface tension shaping the tips of freshly melted optical fiber, the shapes which are obtained are not perfectly spherical, therefore many different radial and polar cavity modes may be observed within the fine-tuning modulation cycle. Each mode possesses a different linewidth and thus a different cavity Q. The laser frequency may be modulated, using its fine-tuning mechanism, across at least one microsphere resonance. If a high-Q mode is desired, then the mode with the most narrow resonance linewidth is selected. In one form of the invention, the resonance linewidth may be measured by a Tektronix digital oscilloscope using its width measurement feature.

The total cavity Q illustrated in FIG. 6A is obtained directly from resonance linewidth measurements. FIG. 6A provides experimental verification of the expression for Q(d) as provided in equation 3. The experimental measurements for FIG. 6A have been obtained by sweeping the frequency of a narrowband laser source across a microsphere resonance, while piezoelectrically modulating the coupling gap. Radial mode numbers ranging from 1 to 10 were then extracted from the data fits.

The coupling-gap resolution $\delta d$ can be obtained using the derivative of equation 4, namely the resonance linewidth function with respect to the coupling gap. The coupling-gap resolution $\delta d$ can be expressed as a function of the linewidth measurement resolution $\delta \Delta v$:

$$\delta d(d, \delta\Delta v, q) = \frac{\delta\Delta v(d)}{d\Delta v(d)/dd} = \frac{N(q)}{2\gamma v}e^{2\gamma d}\delta\Delta v \qquad \text{Eq. 5}$$

Since the linewidth function is exponential for small displacements, there is no maximum linewidth. It can therefore be seen from equation 5 above that the greatest sensitivity is obtained for the smallest possible bias coupling gaps. In one exemplary embodiment, the bias displacement may be about 100 nm, and the linewidth measurement resolution may be about 0.1 MHz. For a 100 nm bias position, the range of near-linearity of the linewidth is approximately 35 nm, to within about 1%. The displacement resolution for the radial mode number q+1 is therefore $5.68 \times 10^{-4}$ microns. For q+10, the displacement resolution becomes $4.37 \times 10^{-4}$ microns. A reasonable value for the lower limit of the displacement measurement range is therefore 0.44 nm. Since the upper limit of the measurement range is given by the maximum detectable separation (approximately 1 $\mu$m), the dynamic range is approximately 2000. When only the region of near-linearity is considered, the dynamic range is reduced to ≈100.

Figure 7:
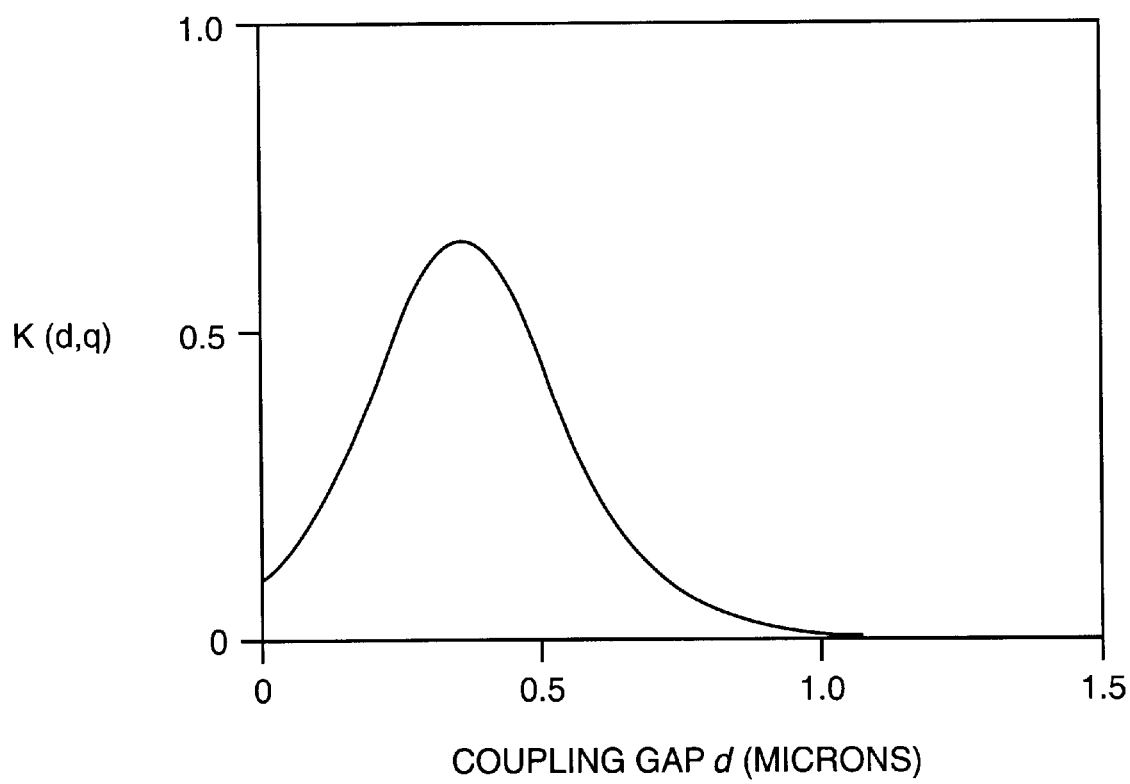
FIG. 7 illustrates the coupling strength K as a function of the coupling gap, in one exemplary embodiment of the present invention.

Another parameter which can be measured and used as an indicator of coupler-microsphere separation is the coupling strength, also referred to as the fractional depth. FIG. 7 illustrates the coupling strength K as a function of the coupling gap, in one exemplary embodiment of the present invention. The coupling strength K can be expressed as a function of the coupling parameter $Q_c(d)$ and intrinsic Q, and therefore the coupling gap d:

$$K(d, q) = \frac{4Q_0 Q_c(d)\Gamma^2}{(Q_0 + Q_c(d))^2} = \frac{4Q_0 N(q) e^{2\gamma d} \Gamma^2}{(Q_0 + N(q) e^{2\gamma d})^2} \quad \text{Eq. 6}$$

In equation 6, $\Gamma$ describes the mode matching between the coupler and the microsphere; $\Gamma+1$ corresponds to a perfect, ideal mode matching condition. A very conservative estimate for the $\Gamma$ value is 0.8, given that coupling strengths as high as 98% have been observed.

In order to maximize the measurement sensitivity, the coupler-microsphere separation should be biased at the location of the maximum derivative of the coupling strength K with respect to the coupling gap, in order to maximize the measurement sensitivity. These locations can be obtained by finding the roots of the second derivative of K with respect to coupling gap (for q+1, $d_1+0.22$ $\mu$m and $d_2=0.52$ $\mu$m). The maximum resolution of this measurement technique is determined using the maximum slope of K (2.124 $\mu$m$^{-1}$):

$$\delta d = \frac{\delta K}{dK/dd} \quad \text{Eq. 7}$$

if the fractional depth measurement resolution $\delta K$ is $10_{-6}$ (obtained using dual-beam, Shot-noise limited detection techniques), then the displacement resolution $\delta d$ is $4.7 \times 10_{-13}$ m.

The dynamic range of the displacement measurements is given by the range of the depth measurements: the lower limit is equal to the displacement resolution when biased at the maximum slope of K, and the upper limit is approximately equal to the maximum detectable separation (≈1 $\mu$m). The dynamic range is therefore approximately $10_6$. The coupling-gap range for near-linearity of K (to within 1%) is 120 nm when biased at 0.22 microns, so the dynamic range corresponding to the region of near-linearity is approximately $10_5$.

Because of the high Q and the long cavity lifetimes of the optical microcavity, the sensor featured in the present invention has a greatly increased resolution and dynamic range, as compared to prior art sensors, such as MEMS accelerometers. Resolutions of up to about 1.0 nm have been obtained, in a compact size comparable with MEMS sensors. This represents an improvement of several orders of magnitude, as compared with the prior art.

A third parameter which can be measured in order to obtain the coupler-microsphere separation is phase. When the microsphere is integrated into a waveguide having an interferometric configuration, the resonant light circulating within the microcavity gains phase with respect to light in a reference channel of the interferometric waveguide. The change in phase experienced by the resonant light can be measured by using a waveguide having an interferometric configuration, for example a waveguide including channels arranged in a Mach-Zehnder type interferometric configuration.

Figure 8:
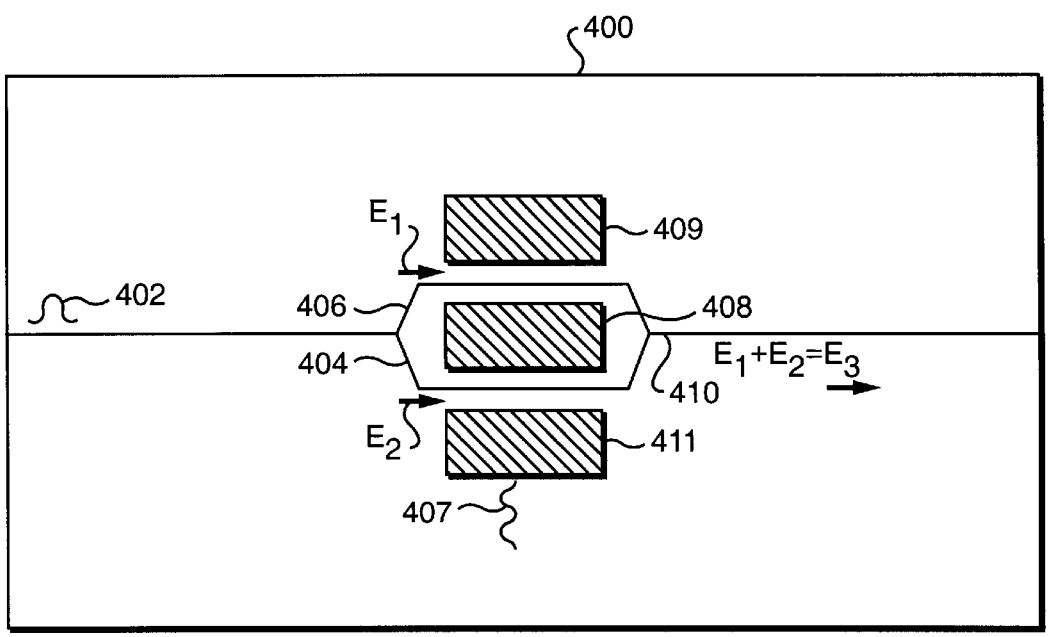
FIG. 8 illustrates a Mach Zehnder interferometer, as known in the prior art.

FIG. 8 illustrates a Mach-Zehnder interferometer 400, as known in the prior art. As known in the prior art, an incoming optical signal 402 in a Mach-Zehnder interferometer is split into two signals, $E_1$ and $E_2$, for example at a Y-junction. Each signal enters a first waveguide branch 404 and a second waveguide branch 406, respectively. The signals are recombined into an output waveguide 410, which provides a modulated optical output signal, $E_3$ ($E_3=E_1+E_2$). The Mach-Zehnder modulator 400 is typically formed of materials that have a high electro-optic coefficient, so that their refractive indices can be altered by applying an electric field in that region. Typically, a modulation signal 407 is applied to a modulator input electrode 408. The signal 407 causes an electric field to be applied to one or both of the waveguide branches 404 and 406. In accordance with the electro-optic effect, the applied electric field causes a change in the refractive index, corresponding to the changing amplitude of the modulating signal. The change in the index of refraction alters the speed of light in the region, resulting in a change in the delay time of the light passing through the region. The modulation signal thus enables the optical path length in one or both of the waveguides branches to be controlled, so that a phase difference results between the two signals $E_1$ and $E_2$, when they are recombined at the output waveguide 410.

Figure 9:
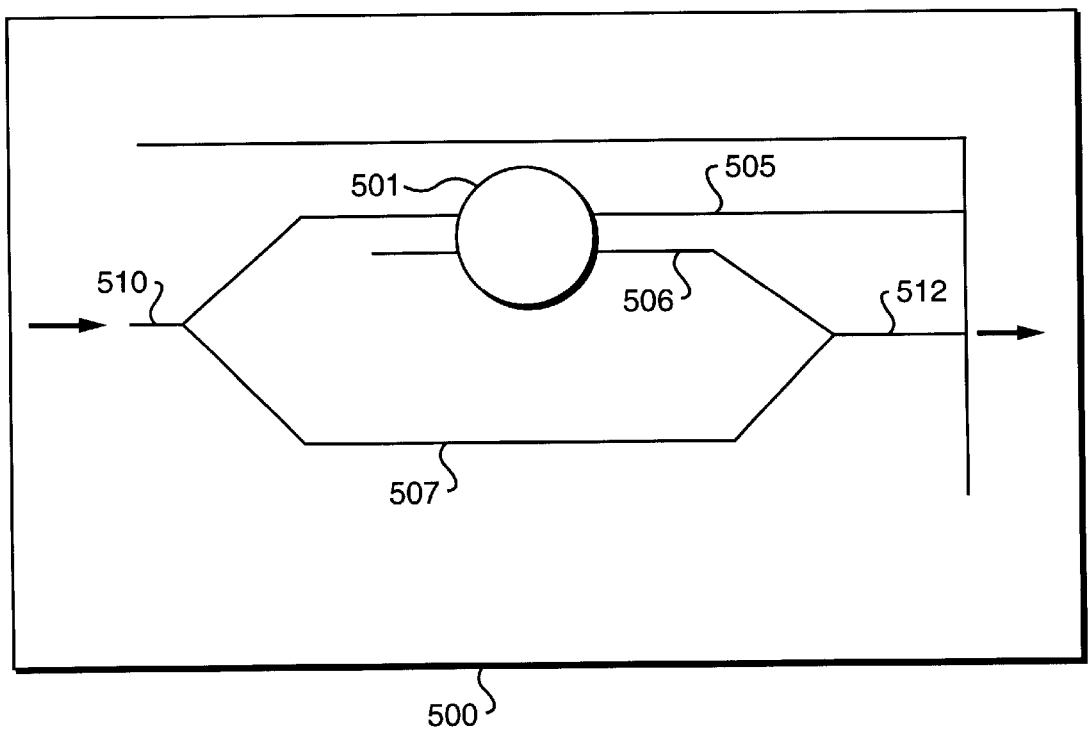
FIG. 9 illustrates a three-armed waveguide having a Mach-Zehnder type interferometric configuration, and adapted to couple light onto an optical microcavity.

FIG. 9 illustrates a three-armed waveguide 500 having a Mach-Zehnder type interferometric configuration, and adapted to couple light onto a microcavity 501. The waveguide 500 has an input end 510 and an output end 512. The interferometric waveguide 500 includes three waveguide arms 505, 506, and 507. The first arm 505 forms an input channel, and is adapted to input coupling light into the microsphere. The second arm 506 forms a drop channel, and is adapted to out-couple light from the microcavity into the waveguide. The third arm 507 is used as a reference channel, which has substantially no interaction with the microcavity.

At the output end 512, light from the reference channel 507 is combined or interfered with light from the drop channel 506, i.e. light that has interacted with the microsphere. A displacement resolution of $10_{-17}$ m can be achieved using this interferometric technique, with only a moderate phase measurement resolution, as shown below.

The change in phase experienced by the resonant light may be expressed in terms of the cavity lifetime $\tau(d)$ and optical path difference (OPD) l(d). The cavity lifetime $\tau(d)$ for resonant light can be expressed as a function of the total cavity Q, and thus the coupling gap, $$\tau(d) = \frac{Q(d)}{\omega} = \frac{\tau_0}{1 + \frac{Q_0}{N(q)} e^{-2\gamma d}} \quad \text{Eq. 8}$$

where $\tau_0 + Q_0/\omega$. Assuming interferometer arms of equal path length (not including the microsphere), the OPD l(d) can then be expressed as a function of the cavity lifetime, $$l(d) = \frac{c}{n}\tau(d) = \frac{\lambda}{2\pi n}Q(d) = \frac{c\tau_0}{n}\frac{1}{1+\frac{Q_0}{N(q)}e^{-2\gamma d}} \qquad \text{Eq. 9}$$

Figure 10:
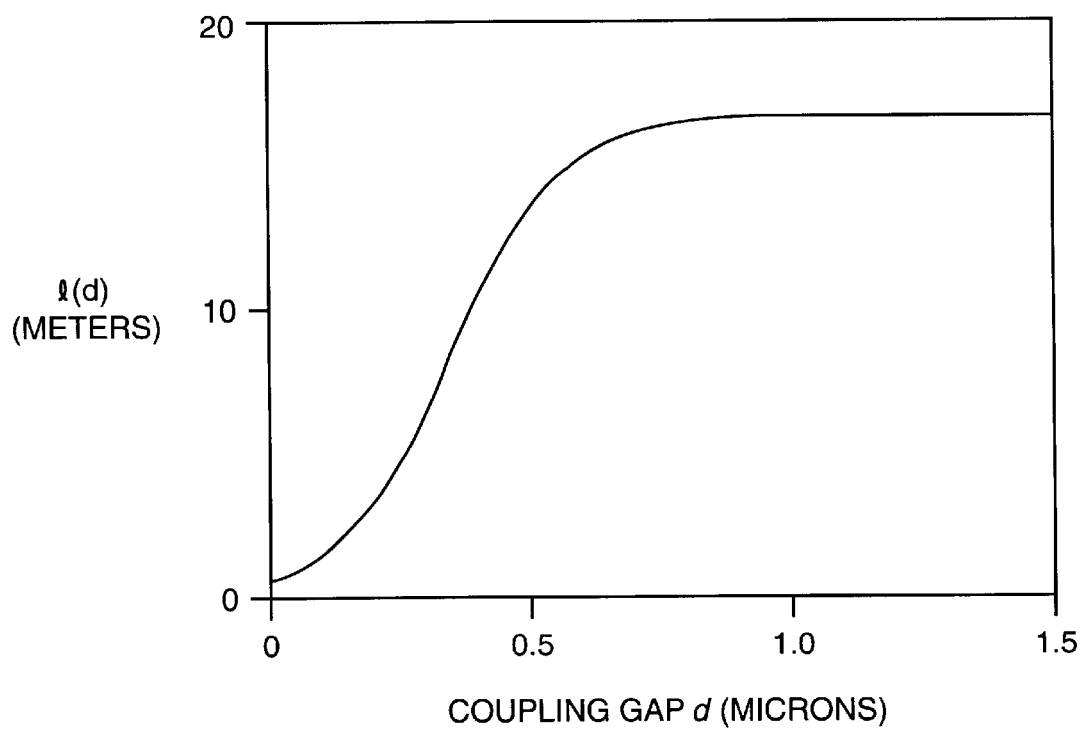
FIG. 10 illustrates the optical path difference l(d) for resonant light propagating through an integrated microcavity interferometer, plotted as a function of the coupling gap.

FIG. 10 illustrates the optical path difference l(d) for resonant light propagating through an integrated microcavity interferometer, plotted as a function of the coupling gap. For large coupling gaps, the OPD can be very long, however for such coupling gaps, the coupling efficiency is very weak and therefore very few photons are coupled into the cavity. The higher the Q of a cavity, the larger the propagation distance within the microcavity.

The phase difference observed between light propagating within the microsphere and light propagating through the reference channel of the interferometer is given by $$\Delta\phi(d) = \frac{2\pi n}{\lambda}l(d) \qquad \text{Eq. 10}$$

Substituting the expression for l(d) as a function of Q(d) from equation 9 yields:

$$\Delta\phi(d) = Q(d). \qquad \text{Eq. 11}$$

The phase difference is thus linear to within about 1%, over a 180 nm range centered around the location of maximum phase difference slope.

Figure 11:
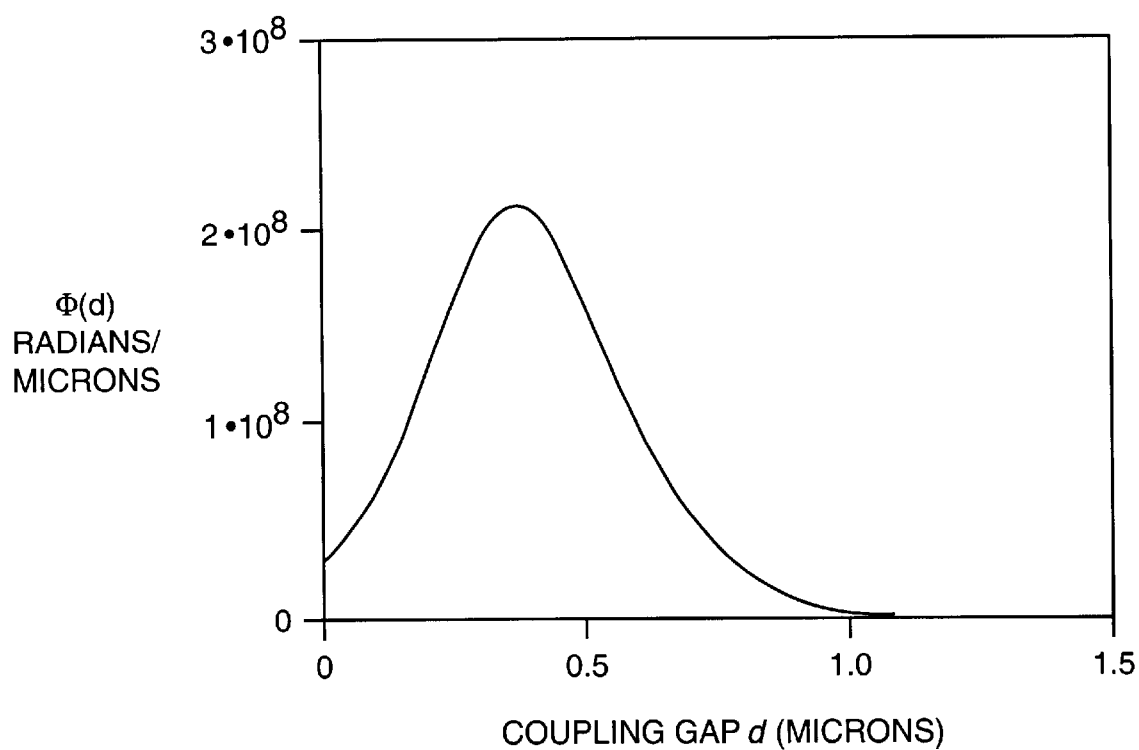
FIG. 11 illustrates the phase change function $\Phi(d)$, as a function of the coupling gap.

FIG. 11 illustrates the phase change function $\Phi(d)$, which provides a measure of the sensitivity of the phase-based coupling-gap measurement technique. The sensitivity is determined using the phase difference change resulting from a change in the optical path length. The phase change function $\Phi(d)$ may be defined as the derivative with respect to d of $$\Delta\phi(d): \Phi(d) = \frac{d}{dd}\Delta\phi(d).$$

Since $\Delta\phi(d) + Q(d)$, the phase change function can be given as a function of the coupling gap d:

$$\Phi(d) = \frac{2\gamma\frac{Q_0^2}{N(q)}e^{-2\gamma d}}{\left(1+\frac{Q_0}{N(q)}e^{-2\gamma d}\right)^2} \qquad \text{Eq. 12}$$

The maximum readout sensitivity is obtained when the device is biased at the coupling gap which corresponds to the maximum value of the phase change function $\Phi(d)$. However, the bias point which corresponds to the maximum range of near-linear response is the coupling gap which provides the maximum slope of $\Phi(d)$. Solving for the roots of the second derivative of $\Phi(d)$ yields d=0.526 $\mu$m and 0.220 $\mu$m. The optimal phase response is therefore $\Phi(0.22$ $\mu$pm)=1.44×10$^8$ radians/micron. Assuming the phase resolution of the optical system to be $10^{-3}$ radians, the corresponding displacement resolution is $10^{-11}$ microns, or $10^{-17}$ meters. As with the other techniques, the upper limit of the dynamic range is approximately equal to the maximum detectable separation ($\approx$1 $\mu$m). The dynamic range is therefore approximately $10^{11}$. If only the linear portion of the phase change function is considered ($\approx$120 nm range for linearity to within 1%), the dynamic range is approximately $10^{10}$.

The range of accelerations which would correspond to a near-linear displacement sensitivity range of $10^{-17}$ m to 120 nm is from about 3×10$^{-10}$ g to about 3 g. FIG. 12 is a table comparing the g-sensitivity of a microcavity resonator sensor, constructed in accordance with the present invention, with the g-sensitivity of existing techniques, for several common acceleration environments. Because of the very stiff flexure provided in the present invention, the g-sensitivity of a microcavity resonator sensor, constructed in accordance with the present invention, is significantly reduced, as shown in FIG. 12.

When the microcavity resonator sensor of the present invention combines the compact size of a MEMS device with a high resolution, by utilizing high-Q optical microcavity resonators, and SPARROW waveguides that allow for high coupling efficiencies. A significantly improved dynamic range is also achieved. Potential embodiments of the present invention include, but are not limited to, accelerometer, gyroscope, vibration meter, gravimeter, displacement sensor, velocity sensor, seismic sensor, While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An optical resonator sensor, comprising:
   A. a substrate;
   B. an optical waveguide, comprising:
      (a) a multi-layer dielectric stack disposed on said substrate, said dielectric stack including alternating high and low refractive index dielectric layers;
      (b) a waveguide core disposed on said dielectric stack and having an input end and an output end, said waveguide core being adapted for transmitting light incident on said input end to said output end;
   C. an optical microcavity disposed along a sensing axis; wherein said optical microcavity is constructed and arranged so as to optically interact with said light incident on said input end of said optical waveguide core; and
   D. a flexure having a first end coupled to said substrate and a second end arranged to interact with said optical microcavity, said flexure being responsive to an input to cause a change in the coupling geometry between said microcavity and said optical waveguide.

2. An optical resonator sensor according to claim 1, wherein said change in the coupling geometry includes a displacement of said optical microcavity along said sensing axis, and wherein said displacement of said optical microcavity is proportional to said inertial input.

3. An optical resonator sensor according to claim 1, wherein said optical microcavity is disposed at a distance from said optical waveguide that is sufficiently small so as to allow evanescent coupling between said microcavity and said optical waveguide.

4. An optical resonator sensor according to claim 3, wherein said distance is less than one wavelength of said optical radiation propagating through said optical waveguide.

5. An optical resonator according to claim 3, wherein said evanescent coupling occurs between an evanescent field of said optical waveguide and a resonant mode of said microcavity, when said evanescent field is characterized by a frequency substantially equal to said resonant mode.

6. An optical resonator sensor according to claim 5, wherein said resonant mode of said optical microcavity is a whispering gallery mode.

7. An optical resonator sensor according to claim 6, wherein said optical microcavity has a substantially spherical shape, and wherein the wavelengths of the whispering gallery modes of said microcavity are about λ and integer multiples thereof, λ being related to the radius r of said substantially spherical microcavity according to the formula:

$$2\pi r = n\lambda,$$

and n is a nonzero integer.

8. An optical resonator according to claim 1, wherein said high index dielectric layer comprises silicon.

9. An optical resonator according to claim 1, wherein said low index dielectric layer and said waveguide core comprises silica.

10. An optical resonator sensor according to claim 1, wherein said optical microcavity is selected from the group consisting of microspheres, microdisks, and microrings.

11. An optical resonator sensor according to claim 1, wherein said optical microcavity is made of silica.

12. An optical resonator sensor according to claim 1, wherein said change comprises a change in the resonance linewidth of at least one resonant mode of said optical microcavity.

13. An optical resonator sensor according to claim 1, wherein said change comprises a change in the resonance frequency of at least one resonant mode of said optical microcavity.

14. An optical resonator sensor according to claim 1, wherein said change comprises a change in the coupling strength between said optical microcavity and said optical waveguide core.

15. An optical resonator sensor according to claim 1, wherein said change comprises a change in the cavity Q of said optical microcavity.

16. An optical resonator sensor according to claim 1, further comprising a light source arranged to input light into said input end of said optical waveguide.

17. An optical resonator sensor according to claim 1, further comprising at least one detector constructed and arranged so as to detect output optical radiation from said output end of said optical waveguide.

18. An optical resonator sensor according to claim 1, wherein said optical waveguide is an integrated optical chip.

19. An optical resonator sensor according to claim 1, wherein the coupling efficiency of said evanescent field into said optical microcavity is from about 95% to about 99.99%.

20. An optical resonator sensor according to claim 1, wherein the reflectivity of said dielectric stack is sufficient to isolate the optical modes within said waveguide core from said substrate.

21. An optical resonator sensor according to claim 1, wherein the reflectivity of said dielectric stack is sufficient to isolate the optical modes in said microcavity from said substrate.

22. An optical resonator sensor according to claim 1, wherein said optical microcavity is fabricated by melting one end of an optical fiber.

23. An optical resonator sensor according to claim 1, wherein said optical microcavity is characterized by a quality factor (Q) from about $10^9$ to about $10^{10}$.

24. An optical resonator sensor according to claim 1, wherein said optical microcavity is characterized by a diameter of about 50 μm to about 500 μm.

25. An optical resonator sensor according to claim 1, wherein said optical microcavity is characterized by a diameter of about 200 μm.

26. An optical resonator sensor according to claim 1, wherein said high refractive index is about 3.5, and said low refractive index is about 1.45.

27. An optical resonator sensor according to claim 1, wherein the thickness and the width of said waveguide core is chosen so as to provide an effective refractive index for said waveguide core that matches the refractive index of said microcavity when a resonant WGM mode is excited therewithin.

28. An optical resonator sensor according to claim 27, wherein said thickness of said waveguide core is about 2.0 μm, said width of said waveguide is about 6.0 μm, and said effective refractive index for said waveguide core is about 1.40.

29. An optical resonator sensor according to claim 1, wherein said optical waveguide comprises:
   a splitter for splitting said input optical radiation into a first signal and a second signal;
   a first waveguide branch and a second waveguide branch for transmitting said first signal and said second signal, respectively; and
   a combiner for recombining said first signal and said second signal.

30. An optical resonator sensor according to claim 29, wherein said optical waveguide includes channels arranged in a Mach-Zehnder interferometer cbnfiguration.

31. An optical resonator sensor according to claim 29, wherein said optical waveguide core includes a drop channel, a throughput channel, and a reference channel, arranged so that the microcavity can optically interact with both the drop channel and the throughput channel, but does not substantially optically interact with light in the reference channel.

32. Anoptical resonator sensor according to claim 1, wherein said input comprises at least one of external force, acceleration, pressure, shear, and strain.

33. An optical resonator sensor according to claim 1, wherein said substrate is in contact with one of said low refractive index layers, and wherein said waveguide core is in contact with a one of said high refractive index layers.

34. An optical resonator sensor according to claim 1, wherein said waveguide core extends within a waveguide plane and along an axis from an input end to an output end, said axis being parallel to said waveguide plane; and
   wherein said sensing axis is perpendicular to said waveguide plane.

35. An optical resonator sensor according to claim 1, further comprising a supporting structure for said flexure, wherein said first end of said flexure is coupled to said substrate through said supporting structure.

36. An optical resonator sensor comprising:
   (a) a substrate;
   (b) an optical waveguide comprising
      (1) a multi-layer dielectric stack disposed on said substrate, said dielectric stack including alternating high and low refractive index layers;
      (2) a waveguide core disposed on the dielectric stack and having an input end and an output end;
   (c) an optical microcavity constructed and arranged so as to optically interact with light incident on the input end of the optical waveguide; and
   (d) a flexure having a first end coupled to the substrate and a second end arranged to interact with said optical microcavity and to move in response to an environmental condition and thereby change the optical mirocavity interaction with light in the optical waveguide.

37. An optical resonator sensor according to claim 36, wherein said environmental condition comprises temperature.

38. An optical resonator sensor, comprising:
A. a substrate;
B. an optical waveguide, comprising:
  (a) a multi-layer dielectric stack disposed on said substrate, said dielectric stack including alternating high and low refractive index-dielectric layers;
  (b) a waveguide core disposed on said dielectric stack and having an input end and an output end, said waveguide core being adapted for transmitting light incident on said input end to said output end;
C. an optical microcavity constructed and arranged so as to optically interact with said light incident on said input end of said optical waveguide core; and
D. a flexure having a first end coupled to said substrate and a second end arranged to interact with said optical microcavity and arranged to move the optical microcavity in response to one of an input and an environmental condition.

* * * * *

UNITED STATES PATENT AND TRADEMARK OFFICE
CERTIFICATE OF CORRECTION

PATENT NO.   : 6,668,111 B2
DATED        : December 23, 2003
INVENTOR(S)  : Haig Charles Tapalian et al.

It is certified that error appears in the above-identified patent and that said Letters Patent is hereby corrected as shown below:

<u>Column 13,</u>
Line 8, correct the equation form "$2\pi r+n\lambda$" to-- $2\pi r=n\lambda$ --.

Signed and Sealed this

Twenty-third Day of March, 2004

JON W. DUDAS
*Acting Director of the United States Patent and Trademark Office*